United States Patent [19]

Agey

[11] 4,066,186
[45] Jan. 3, 1978

[54] INSTANT COFFEE DISPENSER

[76] Inventor: Michael J. Agey, 6917 Security Squadron APO, NY, N.Y. 09240

[21] Appl. No.: 732,040

[22] Filed: Oct. 13, 1976

[51] Int. Cl.² ............................................. B67D 5/22
[52] U.S. Cl. .................................. 222/48; 222/144.5; 222/434
[58] Field of Search .................... 222/144.5, 181, 315, 222/433, 434, 444, 452, 157, 158, 48

[56] References Cited

U.S. PATENT DOCUMENTS

| | | | |
|---|---|---|---|
| 470,018 | 3/1892 | Strong | 222/157 X |
| 2,779,502 | 1/1957 | Ackerman, Jr. | 222/48 |
| 3,018,924 | 1/1962 | Reed | 222/48 |
| 3,122,278 | 2/1964 | Crozier | 222/48 X |

*Primary Examiner*—Drayton E. Hoffman
*Assistant Examiner*—Norman L. Stack, Jr.

[57] ABSTRACT

A dispenser for use in the home, office, or the like, that includes housing means including a pair of storage chambers for containing coffee or the like in one chamber, and sugar, powdered milk or the like in the other chamber, each chamber provided with a discharge funnel terminating in an opening. A stand is coupled to the housing means for retaining the dispenser on a support surface and maintaining each opening elevated above the support surface so that a cup may be placed beneath the openings. Valve means is operatively associated with each of the openings for communicating with and dispensing a selected amount from each of the chambers. The valve means includes a valve member individually and rotatably mounted with respect to each opening and having a spherically curved depression for receiving therein a measured amount of material which is dispensed from the opening upon rotation of the valve member. Gripping means is coupled to one end of each of the valve members and adapted to be gripped by the user of the dispenser for rotation of each valve member for dispensing material from each chamber, and cover means is removably secured to the housing means to permit access to the storage chambers.

3 Claims, 3 Drawing Figures

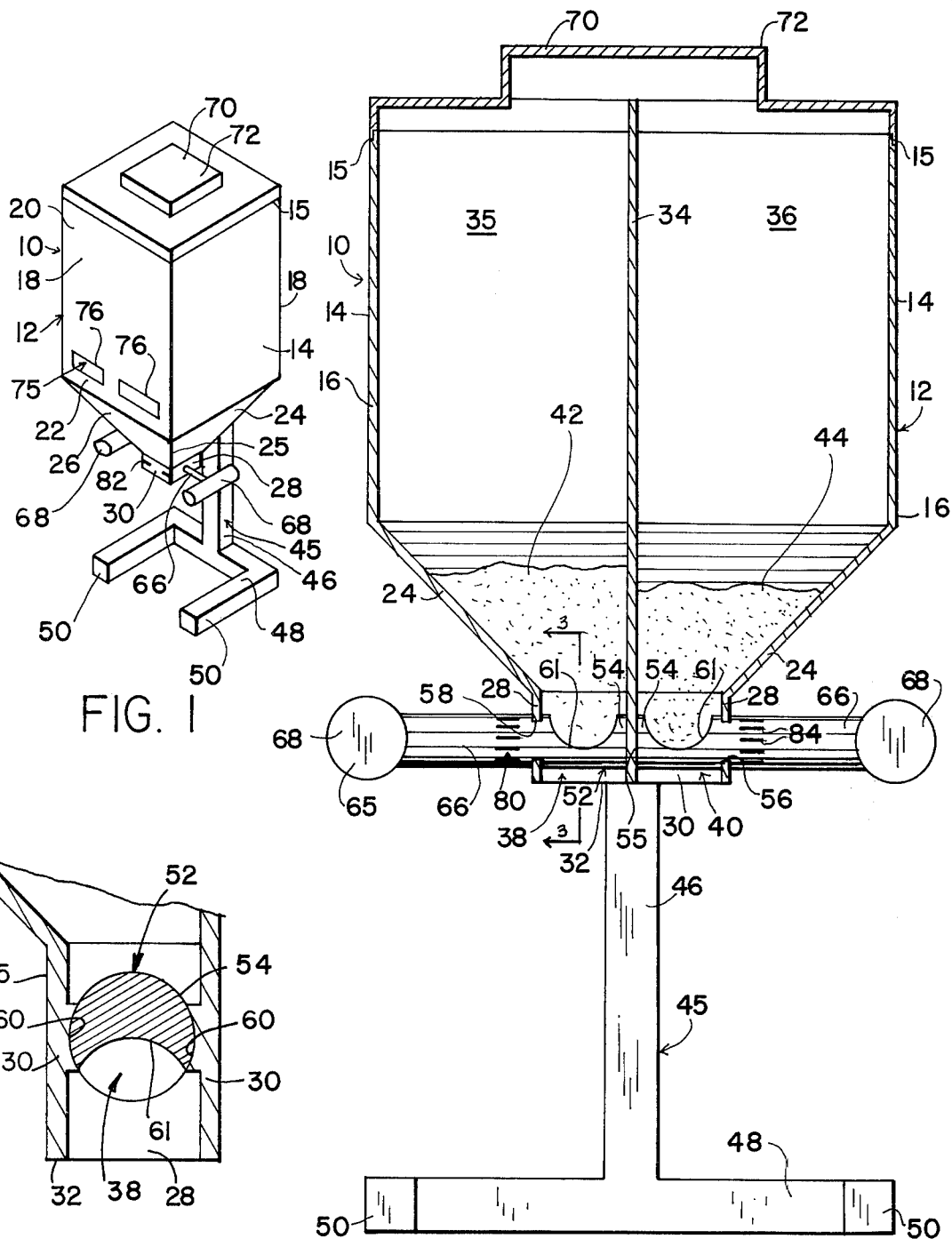

INSTANT COFFEE DISPENSER

BACKGROUND OF THE INVENTION

The present invention relates to a dispenser for use in the home, office or the like for dispensing various materials therefrom, but particularly instant coffee, powdered milk, or sugar.

With the growth of instant coffee, used daily by millions of people, the need has arisen for a simple dispenser that may be used in the home to permit one to readily make a cup of instant coffee with the proper amount of coffee, as well as powdered milk or sugar.

OBJECTS OF THE INVENTION

An object of the present invention is to provide a dispenser for dispensing material in powder form in predetermined or measured quantities, particularly such powders as are used for making instant coffee or the like.

Another object of the present invention is to provide dispensing apparatus for dispensing granular or fragmentary material into a cup that is easy to operate and may be readily cleaned from time to time.

Another object of the present invention is to provide a dispenser that is economical to manufacture so that the cost to the ultimate purchaser is relatively low.

Another object of the present invention is to provide a home dispenser to make instant coffee that is minimal in size and easy to operate.

Other objects and advantages of the present invention will become apparent as the disclosure proceeds.

SUMMARY OF THE INVENTION

A dispenser for use in the home, office, or the like, that includes housing means including a pair of storage chambers for containing coffee or the like in one chamber, and sugar, powdered milk or the like in the other chamber, each chamber provided with a discharge funnel terminating in an opening. A stand is coupled to the housing means for retaining the dispenser on a support surface and maintaining each opening elevated above the support surface so that a cup may be placed beneath the openings.

Valve means is operatively associated with each of the openings for communicating with and dispensing a selected amount from each of the chambers. The valve means includes a valve member individually and rotatably mounted with respect to each opening, and having a spherically curved depression for receiving therein a measured amount of material which is dispensed from the opening upon rotation of the valve member.

Gripping means is coupled to one end of each of the valve members and adapted to be gripped by the user of the dispenser for rotation of each valve member for dispensing material from each chamber, and cover means is removably secured to the housing means to permit access to the storage chambers.

BRIEF DESCRIPTION OF THE DRAWINGS

Although the characteristic features of this invention will be particularly pointed out in the claims, the invention itself, and manner in which it may be made and used, may be better understood by referring to the following description taken in connection with the accompanying drawings forming a part hereof, wherein like reference numerals refer to like parts throughout the several views and in which:

FIG. 1 is a perspective view of a dispenser in accordance with the present invention;

FIG. 2 is an enlarged vertical cross section illustrating the dispenser; and

FIG. 3 is a sectional view taken along line 3—3 of FIG. 2 that has been enlarged to show the workings thereof.

DETAILED DESCRIPTION OF THE DRAWINGS

Referring to the drawings, FIGS 1-3 illustrate a dispenser 10 ideally suited for home use that may be manufactured completely from plastic, or metal if desired, having a minimal number of moving parts. In this manner an economical dispenser can be provided for mass consumption by the consumer. By providing a simple dispenser with a minimal number of moving parts, the problems and costs that would normally be associated with dispensing apparatus, as exemplified by U.S. Pat. Nos. 1,524,585 and 2,779,502, would be avoided.

The dispenser 10 includes housing means 12 adapted to receive therein various ingredients but primarily intended and discussed with reference to instant coffee or the like and the additional ingredients such as sugar and powdered milk normally utilized therewith. The housing means 12 includes a pair of spaced apart side walls 14 that extend vertically from the top end 15 to the bottom end 16 thereof. A pair of spaced apart end walls 18 are provided and joined to the side walls 14 to form a substantially rectangular configuration for the housing means 12. The end walls 18 similarly have an upper end 20 and lower end 22. A pair of inwardly disposed spaced apart inclined side walls 24 are connected to the side walls 14 at one end 16 thereof and form part of a discharged funnel 25 at the bottom end of the housing means 12. A pair of inwardly disposed spaced apart inclined end walls 26 are connected to the bottom end 22 of the end walls 18 and further form part of the discharge funnel 25. A pair of bottom side walls 28 are connected at one end thereof to the inclined side walls 24. In similar fashion a pair of bottom end walls 30 are connected at one end thereof to the inclined end walls 26.

The respective bottom side walls 28 and bottom end walls 30 terminate at the bottom or free end thereof 32 which forms the spout at the bottom end of the housing means 12. The housing means 12 further includes a vertical partition wall 34 which extends from the open upper end of the housing means to the free end 32 thereby forming a pair of chambers or cannisters 35 and 36. The inclined walls 24 and 26 form the discharge funnel with the bottom side walls 28 that extend in substantially parallel spaced relationship to the partition wall 34.

In this manner chamber 35 and chamber 36 is each provided with a discharge funnel terminating in an opening 38 and 40, respectively. The chamber 35 may include a first ingredient material 42 which may be granulated instant coffee, and the second chamber 36 may include a second ingredient 44 that may be sugar or powdered cream. The openings 38 and 40 are disigned to be narrower than the open end of a cup that would be positioned thereunder.

The stand 45 is provided to elevate the bottom end 32 so that a cup could easily fit thereunder. The stand 45 is coupled to the housing means 12 for retaining the dispenser 10 on a support surface and may include a vertical rib 46 secured at one end to the housing means 12 and at its opposite end connected to a cross member 48 that has a pair of legs 50 extending outwardly therefrom to form a base to readily support the housing means 12 when in use.

In order to dispense material from chamber 35 and 36 valve means 52 has been provided and is particularly illustrated in FIG. 3. The valve means 52 is operatively associated with each of the openings 38 and 40 for communicating with and dispensing a selected volume or amount from each of the respective chambers 35 and 36. The valve means 52 includes a valve member 54 associated with each opening 38 and 40. The valve member 54 is mounted in a manner for rotation relative to the respective chambers.

Each valve member 54 has a front end 55 mounted in abutting relationship to the partition wall 34 and having an annular recess 56 adapted to extend within an aperture 58 provided on each bottom or funnel side wall 28. The apertures 58 extend in axial alignment with each other. In this simple manner, without any bearings each valve member 54 which may have a circular outer surface or configuration, as illustrated in FIG. 3, is readily mounted for angular rotation relative to a respective chamber. A valve seat 60 is provided between the walls 30 adjacent the funnel openings 38 and 40 for receiving therein the valve member 54.

Each valve member 54 is provided with a spherically curved depression or recess 61 extending inwardly within each valve member 54. As seen in FIGS. 2 and 3, the recess 61 is adapted for receiving therein a measured amount of material 42 and 44, which is dispensed through the openings 38 and 40 upon rotation of each respective valve member 54. The size of each recess 61 need not be equal in that for the average cup of coffee the volume of granulated coffee dispensed may be greater than the amount of powdered cream.

Gripping means 65 is associated with the valve means 52 and may be integrally formed with or coupled to each of the valve members 54 and adapted to be gripped by the user of the dispenser 10 for rotation of each valve member 54 for dispensing material from the respective chambers 35 and 36. The gripping means 65 may include a gripping member 66 extending in axial alignment with the valve member 54. A transversely extending knob or handle 68 is provided at each end of the gripping members 66. In this manner the user grips the gripping arm 68 and gradually rotates same causing the valve member to likewise rotate and to dispense therefrom the contents of the material in cavity 61 when the valve member is rotated and finally reaches the position illustrated in FIG. 3.

Cover means 70 is provided and removably secured to the upper ends 15 and 20 of the respective walls 14 and 18. Cover means may include a raised lid 72 to facilitate its removal from the housing means 12. Once the cover means 70 is removed, ready access to the chambers 35 and 36 is obtained for replenishing the materials contained therein.

Since it is always a problem as to determining when the chambers have to be refilled, viewing means 75 has been provided and operatively associated with the housing means 12. The viewing means 75 may include a pair of transparent panels 76, one associated with each of the chambers 35 and 36, and mounted on end wall 18 in spaced relationship to each other. In this manner the user is readily reminded when the contents have to be refilled.

By providing the gripping members 66 in axial alignment with each other, it facilitates gripping by the user of the respective arm 68 for angular rotation. Since each person may wish their coffee slightly different as to strength, calibration means 80 has been provided, which is associated with the valve means 52 and the housing means 12. The calibration means 80 permits the user to gauge the degree of rotation of each valve member 54 in order to dispense a selected quantity of material from the recess 61. To accomplish this a reference line 82 has been provided on the bottom end wall 30 that is readily viewable by the user. In addition, a plurality of spaced apart markings in the form of horizontally extending lines 84 have been provided on the gripping member 66. The markings 84 are calibrated relative to the angular rotation of the spherically curved depression 61.

In this manner each user can adjust the amount of rotation of the gripping means 65 to obtain the desired degree of adjustment required to dispense the proper amount of materials 42 and 44 that he or she may require. In this manner, one could obtain a "light" or "dark" cup of coffee. Once again, due to the simplicity of construction, there are effectively no moving parts to get worn out and there are no complicated linkages or other mechanical members that normally become a problem in consumer devices. The entire dispenser may be easily washed from time to time.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A dispenser for use in the home, office, or the like, comprising:
   a. housing means including a pair of storage chambers for containing coffee or the like in one chamber, and sugar, powdered milk or the like in the other chamber, each chamber provided with a discharge funnel terminating in an opening,
   b. said housing means includes:
      1. a vertical partition wall forming said chambers,
      2. said discharge funnel includes a pair of bottom walls in substantially parallel spaced relationship to said partition wall, each having a transversely extending aperture therein,
      3. a pair of spaced apart side walls,
      4. a pair of spaced apart end walls,
      5. a pair of inwardly disposed spaced apart inclined side walls connected to said side walls at one end thereof forming part of said discharge funnel,
      6. a pair of inwardly disposed spaced apart inclined end walls connected to said end walls at one end thereof forming part of said discharge funnel,
      7. a pair of bottom side walls connected at one end thereof to said inclined side walls, and
      8. a pair of bottom end walls connected at one end thereof to said inclined end walls, said bottom end walls and said bottom side walls forming the funnel bottom with said partition wall extending vertically therethrough for forming the funnel openings,
   c. a stand coupled to said housing means for retaining said dispenser on a support surface and maintaining each said opening elevated above the support surface so that a cup may be placed beneath the openings, valve means operatively associated with each of said openings for communicating with and dispensing a selected amount from each of said chambers, said valve means including a valve member individually and rotatably mounted with respect to each said opening, said valve member including a front end and a spherically curved depression for receiving therein a measured amount of material which is dispensed from said opening upon rotation of said valve member, each said valve member has a circular cross-section extending through one of said apertures with said front end mounted in abutting relationship to said partition wall, an annular recess in each said valve member with said funnel wall extending in said recess to maintain said valve member in lateral fixed relationship to the funnel opening, and a valve seat provided adjacent each said funnel opening for receiving one said valve member therein for angular rotation thereof, gripping means coupled to one end of each of said valve members and adapted to be gripped by the user of the dispenser for individual rotation of each valve member for dispensing material from each said chamber, g. said gripping means being in axial alignment with each said valve member and including an enlarged head to facilitate gripping by a user of the dispenser, said valve members being in axial alignment with each other, h. cover means removably secured to said housing means to permit access to said storage chambers.

i. viewing means operatively associated with said housing means to permit a viewing therein to determine the amount of material remaining in each of said chambers, and j. calibration means associated with said valve means and said housing means to permit the user to gauge the degree of rotation of each valve member in order to dispense a selected quantity of material from each said chamber.

2. A dispenser as in claim 1, wherein said viewing means includes a pair of transparent panels mounted on said housing means relative to each said chamber.

3. A dispenser as in claim 1, wherein said calibration means includes a reference line on said housing means and a plurality of spaced apart markings on said gripping means adjacent said housing means calibrated relative to the angular rotation of said spherically curved depression.

* * * * *